United States Patent
Lee et al.

(10) Patent No.: US 7,224,907 B2
(45) Date of Patent: May 29, 2007

(54) DUOBINARY OPTICAL TRANSMISSION APPARATUS

(75) Inventors: Han-Lim Lee, Seoul (KR); Ji-Chai Jeong, Seoul (KR); Yong-Hoon Kim, Seoul (KR); Yun-Je Oh, Yongin-shi (KR); Seong-Taek Hwang, Pyongtaek-shi (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 752 days.

(21) Appl. No.: 10/459,788

(22) Filed: Jun. 12, 2003

(65) Prior Publication Data
US 2004/0096225 A1     May 20, 2004

(30) Foreign Application Priority Data
Nov. 19, 2002    (KR) .................. 10-2002-0071950

(51) Int. Cl.
*H04B 10/04* (2006.01)
*H04B 10/12* (2006.01)
(52) U.S. Cl. .................. 398/186; 398/198; 398/183
(58) Field of Classification Search ........... 398/186, 398/183, 198, 185; 359/276
See application file for complete search history.

(56) References Cited

U.S. PATENT DOCUMENTS 6,865,348 B2 *   3/2005   Miyamoto et al. .......... 398/183

FOREIGN PATENT DOCUMENTS

JP           2002-077059           3/2002

OTHER PUBLICATIONS

Yonghoon Kim, Jaehoon Lee, Yonggyoo Kim ; Jichai Jeong; "Evaluation of Transmission Performance in New Duo-Binary Transmission Using Modulator's Bandwidth or Low-Pass Filter Implemented by Single Capacitor" Photonics Conference 2002, Oct. 30-Nov. 1, 2002, 3 pages.

* cited by examiner

Primary Examiner—M. R. Sedighian
(74) Attorney, Agent, or Firm—Cha & Reiter, LLC

(57) ABSTRACT

A duobinary optical transmission apparatus is provided to generate duobinary optical signals, without using an electric low-pass-filter (LPF), by restricting a bandwidth of a Mach-Zehnder-interferometer-type optical intensity modulator (MZ MOD). Alternatively, a LPF having a single pole with a single capacitor is implemented instead of an expensive LPF, thereby providing a simple transmitter with a lower production cost in comparison with a transmitter using a conventional electric LPF.

11 Claims, 14 Drawing Sheets

BINARY SIGNAL

3-LEVEL DUOBINARY SIGNAL

2-LEVEL DUOBINARY OPTICAL SIGNAL

BINARY SIGNAL

TWO LEVEL
DUO-BINARY SIGNAL

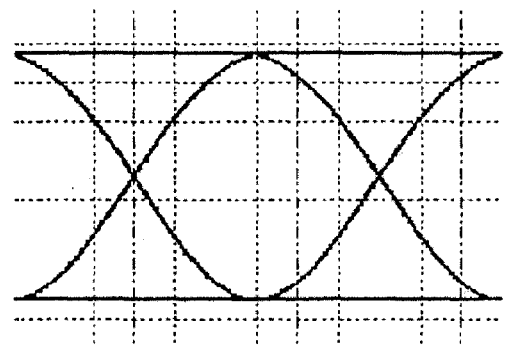
FIG. 10A    BINARY SIGNAL
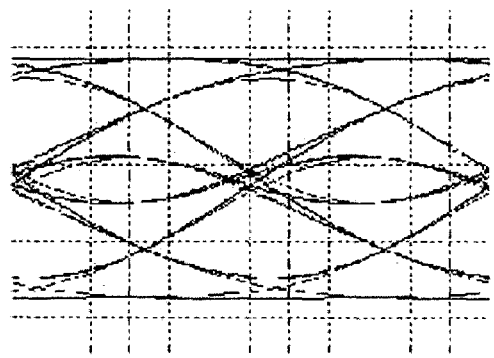
FIG. 10B    THREE LEVEL DUO-BINARY SIGNAL
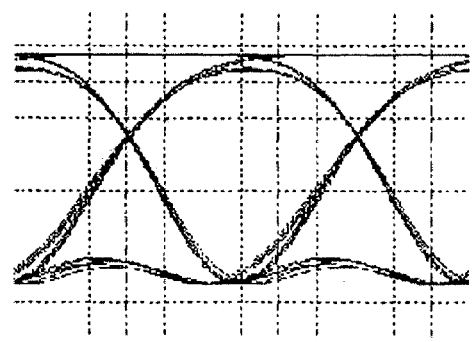
FIG. 10C    TWO LEVEL DUO-BINARY SIGNAL

DUOBINARY OPTICAL TRANSMISSION APPARATUS

CLAIM OF PRIORITY

This application claims priority to an application entitled "DUOBINARY OPTICAL TRANSMISSION APPARATUS," filed in the Korean Intellectual Property Office on Nov. 19, 2002 and assigned Serial No. 2002-71950, the contents of which are hereby incorporated by reference.

BACKGROUND OF THE INVENTION

1. Field of the Invention

The present invention relates to a duobinary optical transmission apparatus using a duobinary optical transmission technique.

2. Description of the Related Art

Typically, a Dense Wavelength Division Multiplexing (DWDM) optical transmission system transmits an optical signal comprised of a plurality of channels with different wavelengths using a single optical fiber in such a way that it enhances transmission efficiency. As such, the DWDM optical transmission system has been widely used in a superhigh-speed Internet network requiring a large amount of data transfer due to its ability to transmit optical signals irrespective of the transfer rate. Recently, systems capable of transmitting more than 100 channels via a single optical fiber using the DWDM optical transmission techniques have been produced commercially, and a new system capable of transmitting more than 200 channels each having a transfer rate of 40 Gb/s (Gigabit per second) simultaneously to accomplish a transfer rate of more than 10 Tbps is being intensively researched.

Although new system accommodates rapidly increasing data traffics as well as transfer requests for high-speed data of more than 40 Gbps, a conventional optical intensity modulation method using a NRZ (Non-Return to Zero) method has a limitation in increasing the transfer quantity as an abrupt interference and distortion between channels occurs in a prescribed zone, which is less than a channel interval of 50 GHz. In addition, the DC frequency components of a conventional binary NRZ transmission signal and the high-frequency components spreading in a modulation process cause nonlinear characteristics and dispersion while the signals are propagated along the optical fiber medium, thereby limiting a transmission distance at a high-speed transfer rate over 10 Gbps.

Currently, an optical duobinary technique has been intensively researched as a new optical transmission technique for obviating the transmission distance limitation caused by the chromatic dispersion. The optical duobinary technique has an advantage in that it reduces a width of a transmission spectrum much more than a general binary transmission method. The transmission distance in a dispersion limitation system is inversely proportional to a square of the transmission spectrum bandwidth. As such, in the case where the transmission spectrum bandwidth is reduced by half, the transmission distance increases by four times. Moreover, a carrier wave frequency is suppressed in a duobinary transmission spectrum such that limitations in the output optical power caused by the Brilloum Scattering stimulated in the optical fiber are reduced.

FIG. 1 is an exemplary view illustrating a block diagram of the conventional duobinary optical transmission apparatus, and FIGS. 2a~2c are views illustrating eye-diagrams of output signals at A, B and C nodes shown in FIG. 1, respectively.

Referring to FIG. 1, a conventional duobinary optical transmission apparatus includes a Pulse Pattern Generator (PPG) 10 for generating electric pulse signals using a NRZ method; a pre-coder 20 for encoding the electric pulse signals; drive amplifiers 30 and 31 for amplifying a two-level signal generated from the pre-coder 20; LPFs (Low Pass Filters) 40 and 41 for converting the amplified two-level signal into a three-level signal and reducing a bandwidth of the three-level signal; a laser source 50 for generating a carrier wave; and, a Mach-Zehnder-interferometer-type optical intensity modulator (MZ MOD) 60 for receiving the amplified three-level signal and converting the carrier wave into a two-level optical signal.

In operation, the NRZ-type electric pulse signals generated by the PPG 10 are encoded as binary signals of 0 or 1 by the pre-coder 20. An output eye-diagram at a node A is shown in FIG. 2a. The two-level binary signal generated from the pre-coder 20 is amplified by the drive amplifiers 30 and 31, then transmitted to the LPFs 40 and 41. The LPFs 40 and 41 each have a bandwidth corresponding to about ¼ of a clock frequency of the two-level binary signal. This excessive bandwidth restriction causes interference between codes, and the two-level binary signal is converted into a three-level duobinary signal because of this interference between codes. An output eye-diagram at a node B is shown in FIG. 2b.

Note that the amplified three-level duobinary signal is used as a driving signal of the Mach-Zehnder-interferometer-type optical intensity modulator (MZ MOD) 60. The carrier wave generated from the laser source 50 modulates its own phase and its own optical intensity according to the driving signal of the MZ MOD 60, and is thereby generated as a two-level optical duobinary signal. An output eye-diagram at a node C is shown in FIG. 2C. Referring back to FIG. 1, a reference character $\overline{Q}$ indicates the inverted signal of a signal Q, and the signals Q and $\overline{Q}$ are respectively transmitted to a positive electrode (+) and a negative electrode (−) of the MZ MOD 60 with a dual electrode structure.

The MZ MOD 60 is classified into a Z-cut type MZ MOD and an X-cut type MZ MOD according to its own electrode structure. As shown in FIG. 1, the Z-cut type MZ MOD having a dual electrode connects its own both arms to the drive amplifiers 30 and 31 and the LPFs 40 and 41 in such a way that a three-level electric signal is applied to each of both electrodes of the Z-cut type MZ MOD. Although the X-cut type MZMOD having a single electrode is not shown in the drawings, it connects its own one arm to a drive amplifier and a LPF in order to transmit a three-level signal to one electrode.

FIGS. 3a~3b are views illustrating the eye-diagrams of output signals transmitted via a single mode optical fiber using a duobinary optical transmission apparatus. Referring to FIGS. 3a~3b, it is noted that eye-diagrams are relatively maintained clearly in the range of a transmission distance from 0 km (shown in FIG. 3a) to 160 km (shown in FIG. 3b).

However, the aforementioned conventional duobinary transmission technique generates a three-level electric signal using a LPF, such that a difference is generated on the basis of dependency of transmission quality corresponding to the transmission characteristics of a LPF and the length of a Pseudo Random Bit Sequence (PRBS), thereby causing a serious problem in an overall system. This jitter problem is generated in the Z-cut type or X-cut type conventional structure. Accordingly, a dependency of such signal patterns provides a limitation in a real optical transmission operation.

Furthermore, in case of using the Z-cut type MZ MOD having a dual electrode, the output signals Q and $\overline{Q}$ are respectively input to LPFs of both arms of the Z-cut type MZ MOD, amplified by amplifiers, and then transmitted to both terminals of the Z-cut type MZ MOD. In this case, the Z-cut type MZ MOD must perform a push-pull operation, where electric signals applied to both terminals of the Z-but type MZ MOD must have different polarities having a difference 180° therebetween. In the case where the electric signals do not have such different polarities, it is necessary to adjust a phase using a delay line. Thus, two LPFs and two amplifiers must have the same characteristics. However, it is impossible to manufacture two LPFs and amplifiers with same characteristics as a tiny difference between the two LPFs or the two amplifiers is unavoidable during the manufacturing process.

In addition, a Bessel-Thomson type LPF widely used as a LPF is very expensive, thereby increasing the cost of production of an overall optical transmission apparatus.

SUMMARY OF THE INVENTION

Therefore, the present invention has been made in view of the above problems and provides additional advantages, by providing a duobinary optical transmission apparatus that does not use expensive electric LPFs, reduces the number of components used for a transmitter, reduces a production cost, and increases tolerance for nonlinear and dispersion characteristics in a long-distance WDM transmission process.

According to one aspect of the present invention, a duobinary optical transmission apparatus using a dubinary transmission method which is not affected from transmission characteristics related to a PRBS (Pseudo Random Bit Sequence) is provided.

According to another aspect of the present invention, a duobinary optical transmission apparatus is provide and includes: a Pulse Pattern Generator (PPG) for generating an electric pulse signal using a NRZ method; a pre-coder for encoding the electric pulse signal; an amplifier for amplifying a two-level electric signal generated from the pre-coder; a laser source for generating a carrier wave; and, a Mach-Zehnder-interferometer-type optical intensity modulator (MZ MOD) for receiving the amplified two-level signal, for converting the amplified two-level signal to a three-level signal, and for modulating the carrier wave with a two-level optical signal upon receiving the converted three-level signal.

Preferably, the Mach-Zehnder-interferometer-type optical intensity modulator (MZ MOD) may have a bandwidth corresponding to about ⅕ of a data transfer rate.

According to another aspect of the present invention, there is provided a duobinary optical transmission apparatus, which includes: a Pulse Pattern Generator (PPG) for generating an electric pulse signal using a NRZ method; a pre-coder for encoding the electric pulse signal; an amplifier for amplifying a two-level signal generated from the pre-coder; a single-pole type LPF with a single capacitor for converting the amplified two-level signal into a three-level signal and for reducing a bandwidth of the three-level signal; a laser source for generating a carrier wave; and, a Mach-Zehnder-interferometer-type optical intensity modulator (MZ MOD) for modulating the carrier wave with a two-level optical signal upon the receipt of the three-level signal.

BRIEF DESCRIPTION OF THE DRAWINGS

The above and other features and other advantages of the present invention will be more clearly understood from the following detailed description taken in conjunction with the accompanying drawings, in which:

FIGS. 10a~10c are views illustrating the eye-diagrams of output signals at X, Y and Z nodes shown in FIG. 8 in accordance with another preferred embodiment of the present invention;

DETAILED DESCRIPTION OF THE PREFERRED EMBODIMENTS

Figure 1:
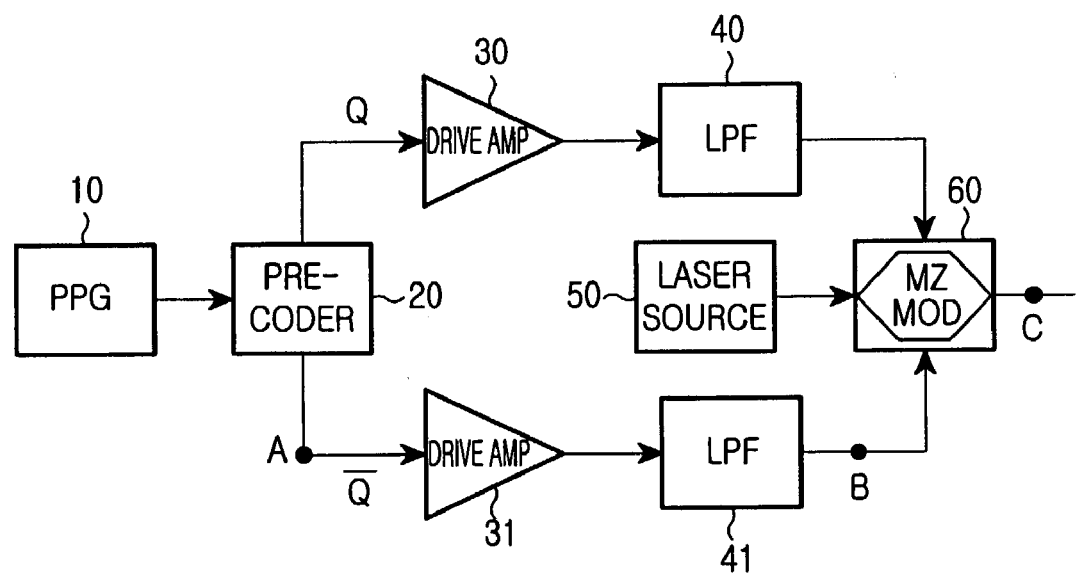
FIG. 1 is an exemplary view illustrating the block diagram of a conventional duobinary optical transmission apparatus.
Figure 2A:
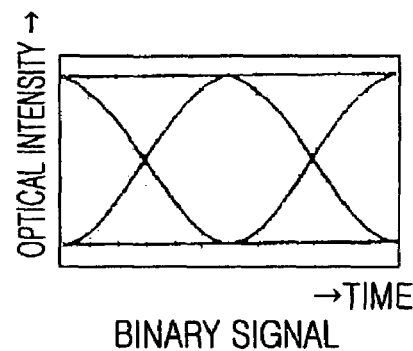
FIGS. 2a~2c are views illustrating the eye-diagrams of output signals at A, B and C nodes shown in FIG. 1, respectively.
Figure 2B:
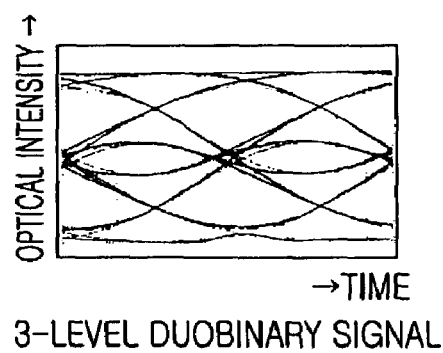
Figure 2C:
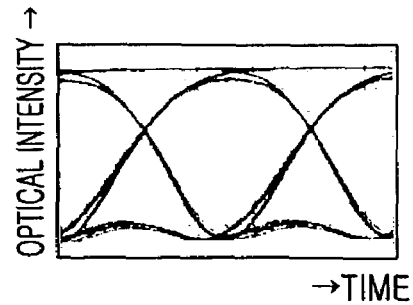

Now, preferred embodiments of the present invention will be described in detail with reference to the annexed drawings. In the drawings, the same or similar elements are denoted by the same reference numerals even though they are depicted in different drawings. For the purposes of clarity and simplicity, a detailed description of known functions and configurations incorporated herein will be omitted as it may make the subject matter of the present invention rather unclear.

Figure 4:
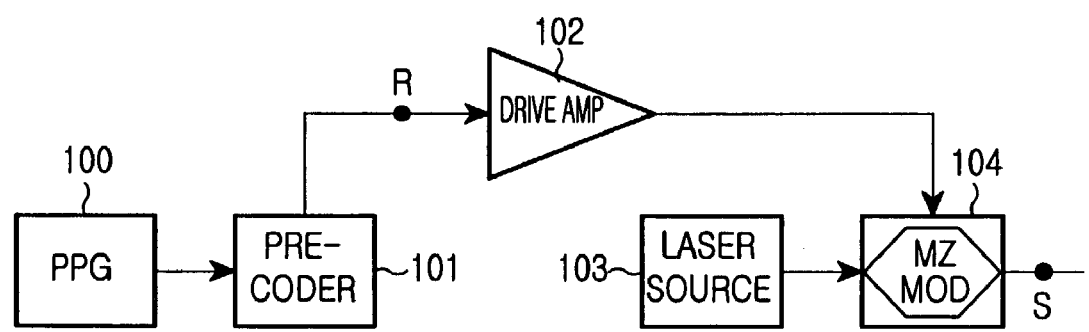
FIG. 4 is a view illustrating the block diagram of a duobinary optical transmission apparatus in accordance with a preferred embodiment of the present invention.

FIG. 4 is a view illustrating the block diagram of a duobinary optical transmission apparatus in accordance with a preferred embodiment of the present invention. Although the present invention describes an X-cut type MZ MOD with a single electrode, it should be noted that the teachings of the present invention can be implemented with a Z-cut type MZ MOD with a dual electrode. Thus, the description with respect to the X-cut type MZ MOD in the specification should not impose limitations on the scope of the invention.

Referring to FIG. 4, a duobinary optical transmission apparatus according to the present invention includes a Pulse Pattern Generator (PPG) 100 for generating an electric pulse signal using a NRZ method; a pre-coder 101 for encoding the electric pulse signal; a drive amplifier 102 for amplifying a two-level signal generated from the pre-coder 101; a laser source 103 for generating a carrier wave; and, a Mach-Zehnder-interferometer-type optical intensity modulator (MZ MOD) 104 for receiving the amplified two-level signal, for converting the amplified two-level signal to a three-level signal, and for modulating the carrier wave with a two-level optical signal upon receipt of the converted three-level signal.

Figure 5A:
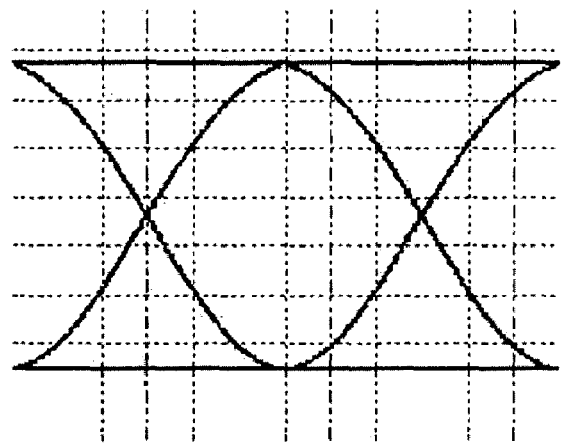
FIGS. 5a~5b are views illustrating the eye-diagrams of output signals at nodes R and shown in FIG. 4 in accordance with a preferred embodiment of the present invention.

In operation, the NRZ-type electric pulse signal generated by the PPG 100 is encoded as a binary signal of 0 or 1 by the pre-coder 101. An output eye-diagram at a node R is shown in FIG. 5a. Note that an encoding method shown in FIG. 5a makes it possible to accomplish a duobinary transmission/reception operation without changes in a receiver. The two-level binary signal generated from the pre-coder 101 is amplified by the drive amplifier 102. Here, the magnitude of the amplified electric signal is increased by almost two times the switching voltage of the MZ MOD 104. The amplified signal is applied to a modulation terminal RF (not shown) of the MZ MOD 104 having an X-cut single-electrode structure, where a two-level signal is converted to a three-level signal by a low bandwidth of the MZ MOD 104. The converted three-level signal modulates the carrier wave received from the laser source 103 having a two-level optical signal. Note that this type of signal conversion procedure for converting a two-level signal into a three-level signal using the MZ MOD 104 is the same as the LPF usage procedure of a conventional duobinary optical transmission apparatus shown in FIG. 1. In order to overcome the prior art problem of using a LPF, a bandwidth of a MZ MOD 104 having a low bandwidth corresponding to about ⅕ of the data speed is used, thus eliminating the need for the conventional LPF.

Typically, a slope along which a signal's level changes from a 0-level to a 1-level is different from a slope along which a signal's level changes from the 1-level to the 0-level. However, in case of a duobinary optical transmission apparatus using LPFs as in the conventional art, parts having different slopes are mutually summed up at one time such that a first signal transition from 0-level to 1-level and a second signal transition from 1-level to 0-level are performed, thereby increasing jitters of output waves.

Figure 5B:
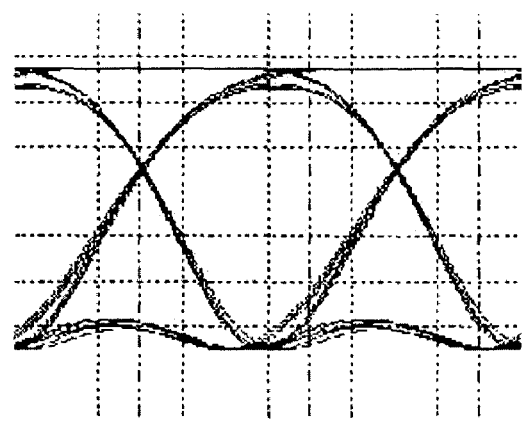
Figure 6:
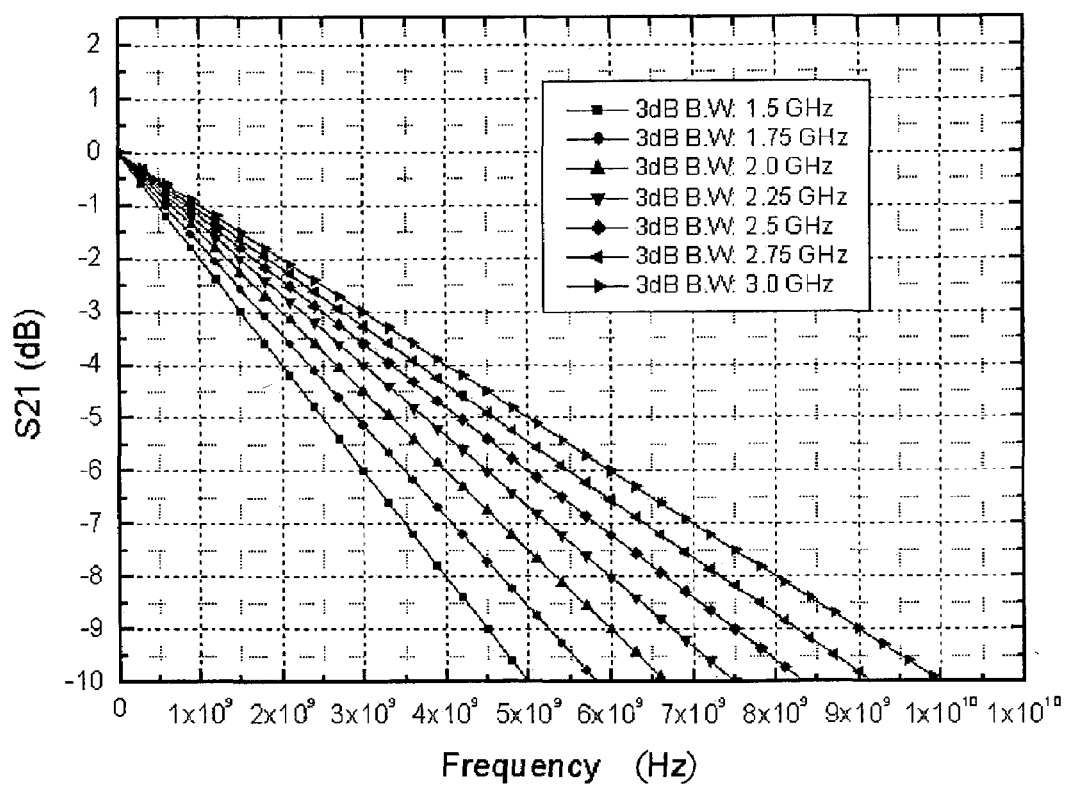
FIG. 6 is a view illustrating the frequency characteristics of a modulator having a variety of bandwidths.

In general, the bandwidth of a Bessel-Thomson LPF used for a duobinary modulation method corresponds to ¼ of a clock frequency of a two-level binary signal. That is, a bandwidth of 2.5 GHz is used for the Bessel-Thomson LPF. However, the frequency characteristic of the MZ MOD 104 has a low slope, such that the MZ MOD 104 has the optimal frequency characteristics at a LPF's bandwidth of about 1.75 GHz in case of using a LPF of 10 Gbps. Therefore, in accordance with a preferred embodiment of the present invention, a bandwidth of the MZ MOD 104 becomes a low bandwidth corresponding to about ⅕ of the data speed in such a way that interference between codes is generated by excessive restriction of the bandwidth, and therefore a two-level signal is converted into a three-level signal due to the interference between 0-level signal and 1-level signal. An eye-diagram at a node S being an output node of the MZ MOD 104 is shown in FIG. 5b. Note that FIG. 6 is a view illustrating frequency characteristics of a modulator having a variety of bandwidths used to set up an optimum bandwidth.

Figure 3A:
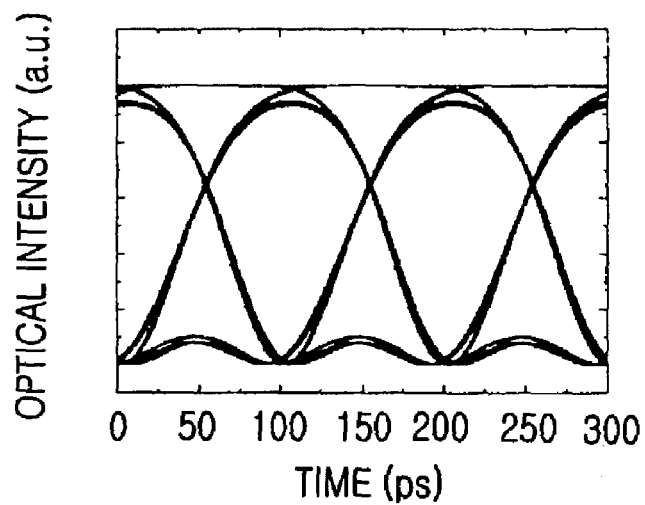
FIGS. 3a~3b are views illustrating the eye-diagrams of output signals transmitted via a single mode optical fiber using a conventional duobinary optical transmission apparatus.
Figure 3B:
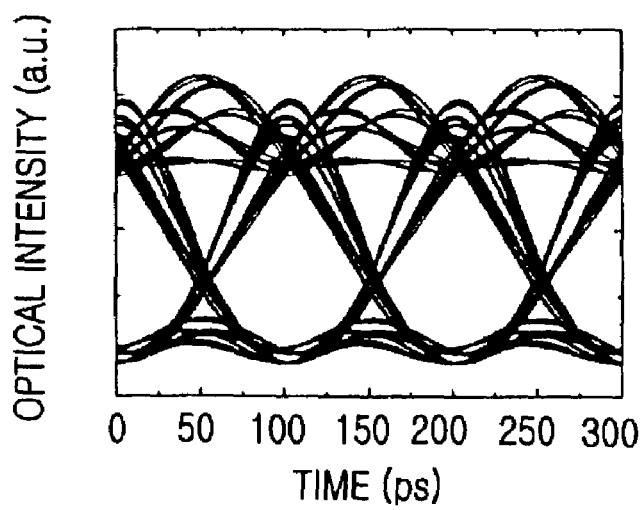
Figure 7A:
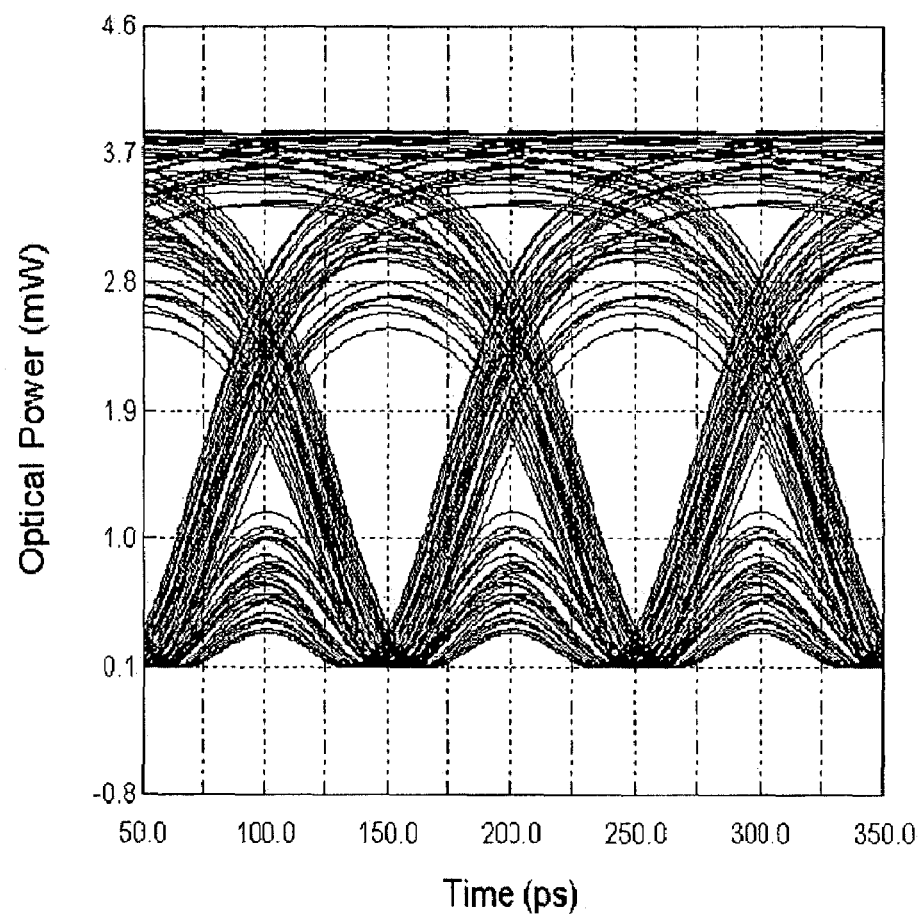
FIGS. 7a~7b are views illustrating the eye-diagrams of output signals transmitted via a single mode optical fiber using a duobinary optical transmission apparatus in accordance with a preferred embodiment of the present invention.
Figure 7B:
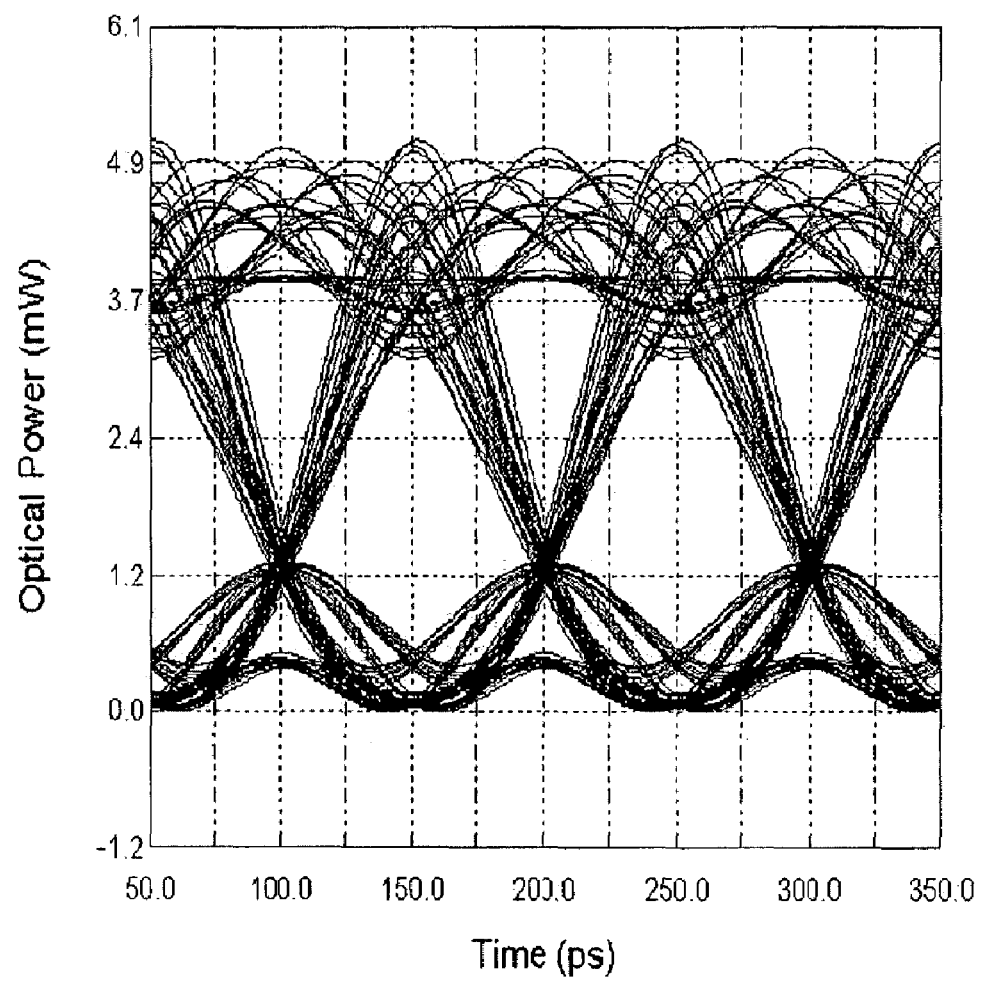

FIGS. 7a~7b are views illustrating the eye-diagrams of output signals transmitted via a single mode optical fiber using a duobinary optical transmission apparatus in accordance with a preferred embodiment of the present invention. In the same manner as FIGS. 3a~3b, it is noted that the eye-diagrams are relatively maintained clearly in a range of a transmission distance from 0 km (shown in FIG. 7a) to 160 km (shown in FIG. 7b).

Figure 8:
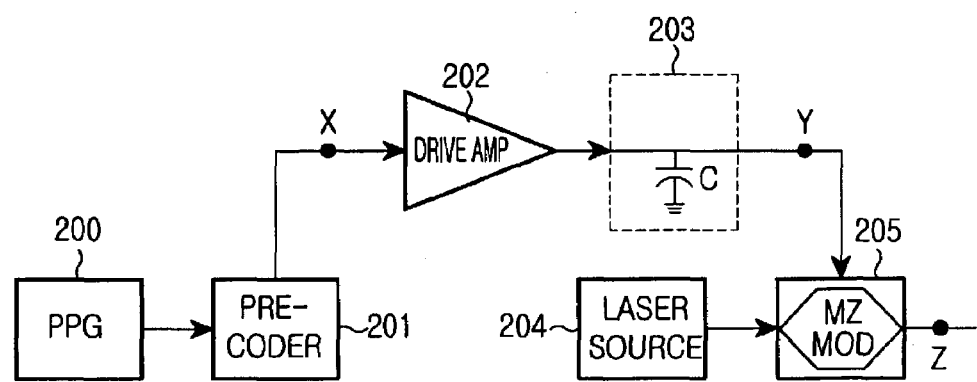
FIG. 8 is a view illustrating the block diagram of a duobinary optical transmission apparatus in accordance with another preferred embodiment of the present invention.

FIG. 8 is a view illustrating the block diagram of a duobinary optical transmission apparatus in accordance with a second preferred embodiment of the present invention. In the same manner as the aforementioned first preferred embodiment, although the second preferred embodiment of the present invention describes an X-cut type MZ MOD with a single electrode, it can be implemented with a Z-cut type MZ MOD with a dual electrode.

Referring to FIG. 8, a duobinary optical transmission apparatus according to the present invention includes a PPG (Pulse Pattern Generator) 200 for generating an electric pulse signal using a NRZ method; a pre-coder 201 for encoding the electric pulse signal; a drive amplifier 202 for amplifying a two-level signal generated from the pre-coder 201; a single-pole type filter 203 with a single capacitor, for converting the amplified two-level signal into a three-level signal, and reducing a bandwidth of the three-level signal; a laser source 204 for generating a carrier wave; and, a Mach-Zehnder-interferometer-type optical intensity modulator (MZ MOD) 205 for modulating the carrier wave with a two-level optical signal upon receiving the three-level signal.

The construction and operation of the second embodiment are essentially same as that described above with respect to FIG. 4. The only notable difference is that a single capacitor 203 is provided to determine the bandwidth. Hence, the discussion of similar components described in the preceding paragraphs is omitted to avoid redundancy, as they are described with respect to FIG. 4.

Figure 9:
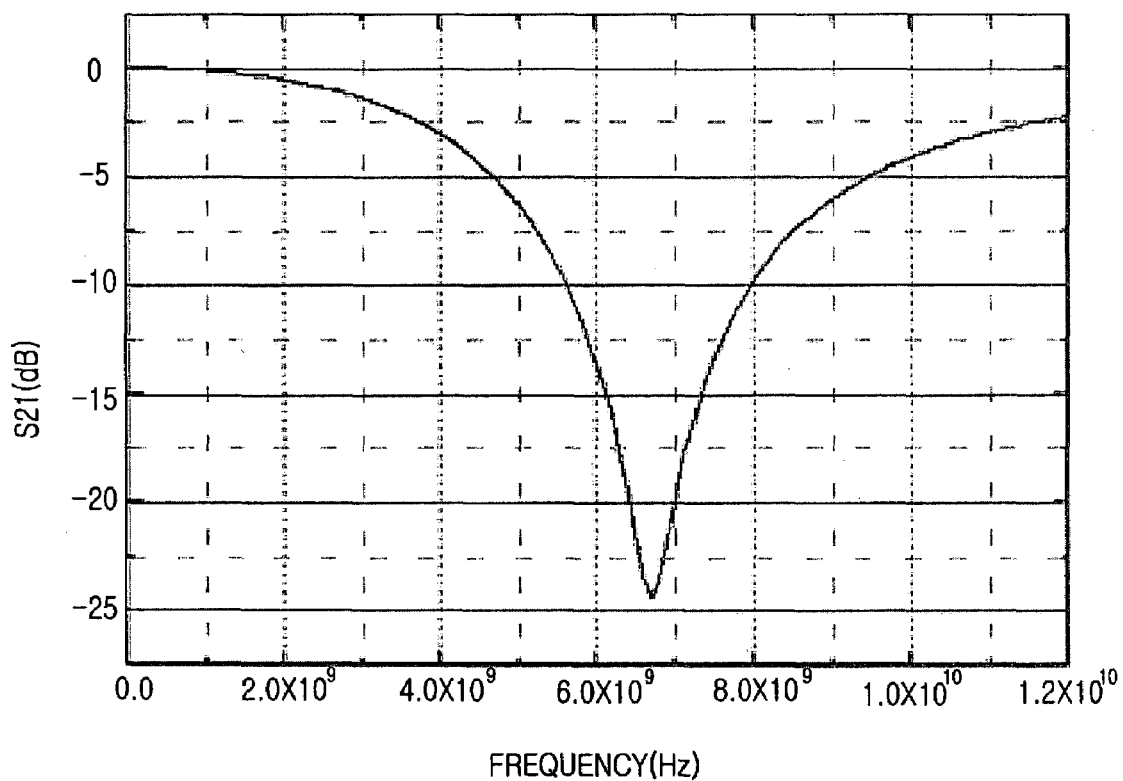
FIG. 9is a view illustrating the frequency characteristics of a LPF in accordance with another preferred embodiment of the present invention.

As shown in FIG. 8, the LPF 203 having a single pole connects a single shunt capacitor C between the drive amplifier 202 and the MZ MOD 205, and a bandwidth is determined by a capacitance of the capacitor C. FIG. 9 is a view illustrating the frequency characteristics of such a LPF in accordance with the second preferred embodiment of the present invention.

FIGS. 10a~10c are views illustrating the eye-diagrams of output signals at X, Y and Z nodes shown in FIG. 8 in accordance with another preferred embodiment of the present invention. Comparing eye-diagrams of the output signals at X, Y and Z nodes shown in FIG. 8 with those of output signals at A, B and C nodes shown in FIG. 1, it can be seen that there is little difference between them.

Figure 11A:
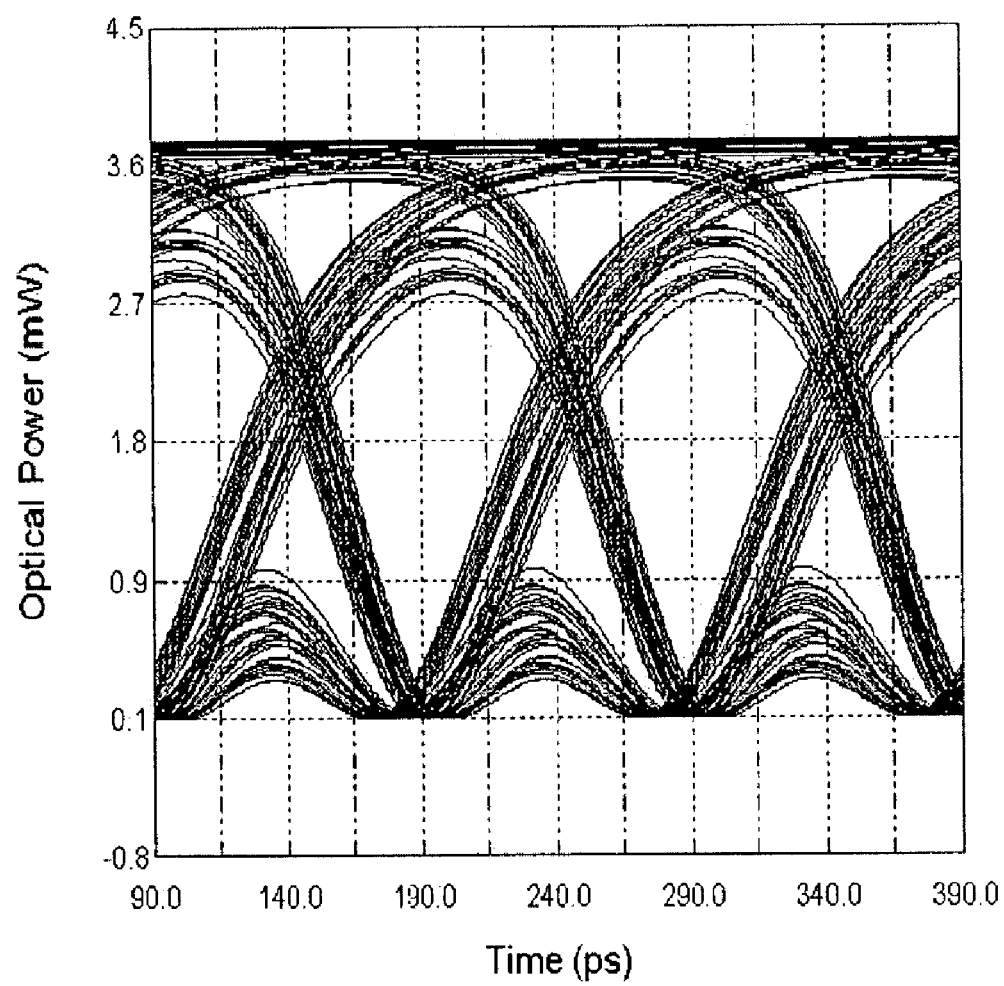
FIGS. 11a~11b are views illustrating the eye-diagrams of output signals transmitted via a single mode optical fiber using a duobinary optical transmission apparatus in accordance with another preferred embodiment of the present invention; and, FIG. 12 is a view illustrating the BER (Bit Error Rate) characteristics in response to transmission distances of duobinary optical transmission apparatuses in accordance with preferred embodiments of the present invention.
Figure 11B:
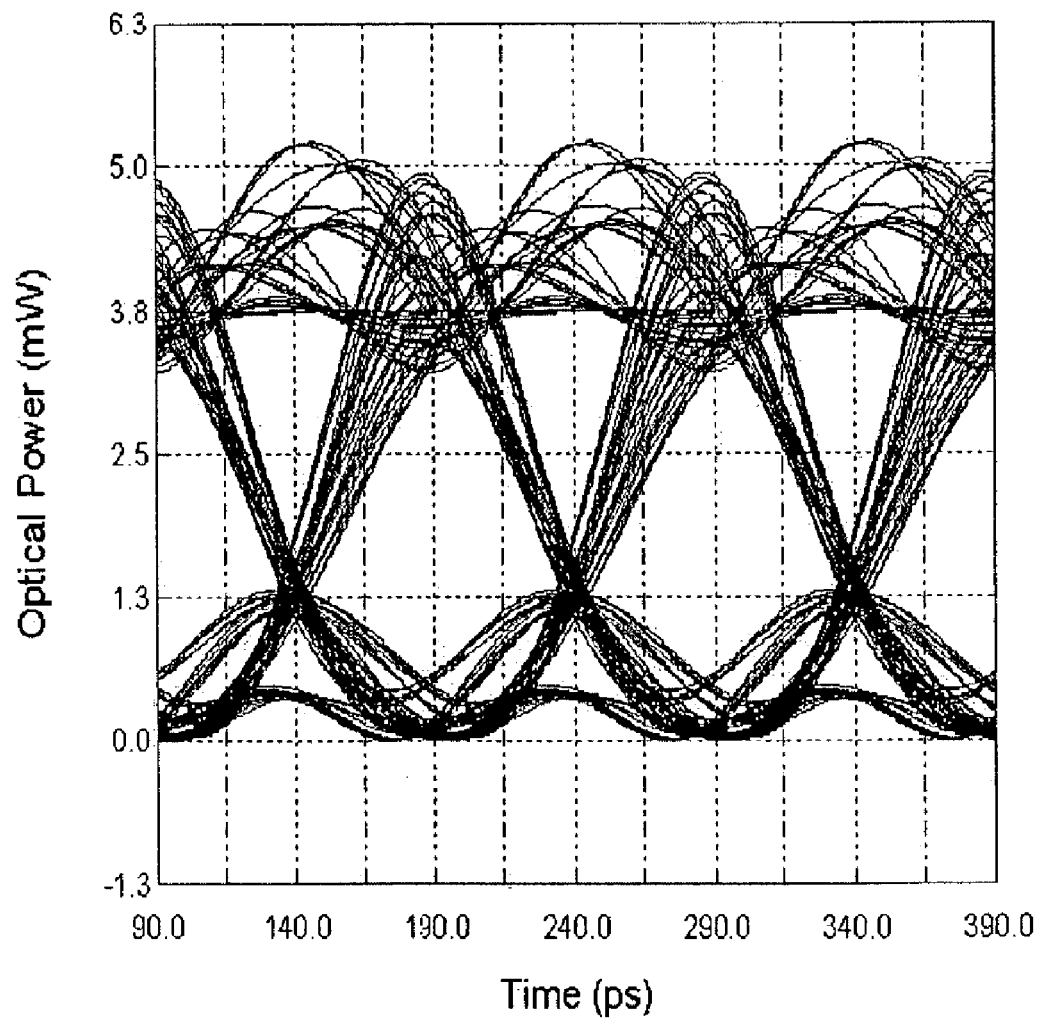

FIGS. 11a~11b are views illustrating the eye-diagrams of output signals transmitted via a single mode optical fiber using a duobinary optical transmission apparatus in accordance with the second preferred embodiment of the present invention. In the same manner as FIGS. 3a~3b and FIGS. 6a~6b, it is noted that the eye-diagrams are relatively maintained clearly in a range of a transmission distance from 0 km to 160 km.

Figure 12:
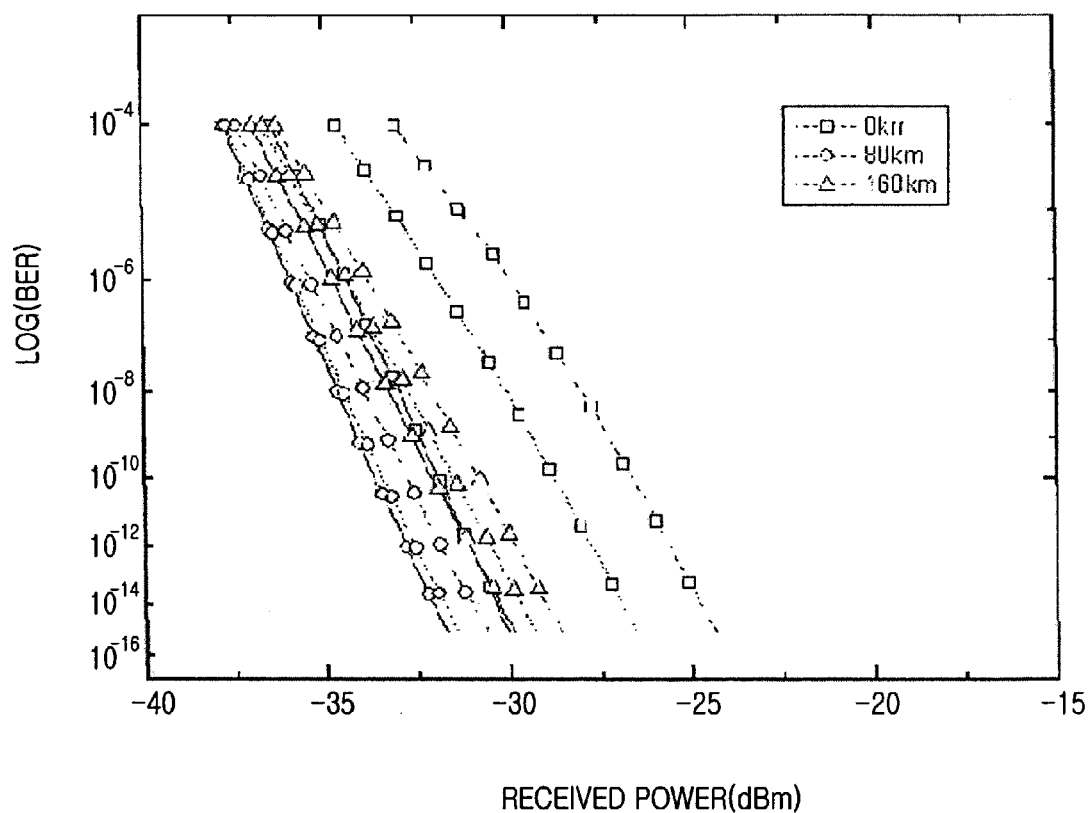

FIG. 12 is a view illustrating the BER (Bit Error Rate) characteristics in response to the transmission distances of duobinary optical transmission apparatuses in accordance with preferred embodiments of the present invention as described above. In particular, a solid line indicates a case where a conventional duobinary transmitter is used, a dotted line indicates a case where a duobinary transmitter for limiting a bandwidth of a modulator (i.e., MZ MOD) is used in accordance with the first preferred embodiment of the present invention, and a chain line indicates a case where a duobinary transmitter using a capacitor is used in accordance with the second preferred embodiment of the present invention. As shown in FIG. 12, the BER characteristics of each transmitter after data transmission has been performed at a plurality of transmission distances 0 km, 80 km and 160 km are shown. It is noted that the three kinds of transmitters indicate similar BER results in the range from 0 km to 160 km.

As apparent from the above description, duobinary optical transmission apparatus according to the present invention is very resistant to a dispersion phenomenon by at least two times in comparison with other modulation methods, such as a NRZ and a RZ, and generates a duobinary optical signal without the incorporation of expensive LPFs, thereby providing a simple transmitter with a lower production cost than the conventional transmitter using an electric LPF.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A duobinary optical transmission apparatus, comprising:
   a generator configured to generate an electric pulse signal using a NRZ process;
   a pre-coder configured to encode the electric pulse signal, the pre-coder having a single output;
   an amplifier configured to amplify a two-level electric signal generated from the pre-coder;
   a laser source configured to generate a carrier wave; and,
   an optical intensity modulator configured to convert the amplified two-level signal to a three-level signal and to modulate the carrier wave having a two-level optical signal with the converted three-level signal.

2. The duobinary optical transmission apparatus of claim 1, wherein the optical intensity modulator has a bandwidth corresponding to about ⅕ of a data transfer rate.

3. The duobinary optical transmission apparatus of claim 1, wherein the magnitude of electric signal amplified by the drive amplifier is substantially twice that of a switching voltage value of the optical intensity modulator.

4. The duobinary optical transmission apparatus of claim 1, wherein the optical intensity modulator is a Mach-Zehnder interferometer type modulator (MZ MOD).

5. The duobinary optical transmission apparatus of claim 4, wherein the MZ MOD comprises one of a X-cut type MZ MOD having a single electrode and a Z-cut type MZ MOD having a dual electrode.

6. The duobinary optical transmission apparatus of claim 1, wherein the generator is a pulse pattern generator.

7. A duobinary optical transmission apparatus, comprising:
   a generator for generating an electric pulse signal using a NRZ process;
   a pre-coder for encoding the electric pulse signal;
   an amplifier for amplifying a two-level signal generated from the pre-coder;
   a filter having a single capacitor for converting the amplified two-level signal into a three-level signal and for reducing a bandwidth of the three-level signal;
   a laser source for generating a carrier wave; and,
   an optical intensity modulator for modulating the carrier wave having a two-level optical signal with the three-level signal.

8. The duobinary optical transmission apparatus of claim 7, wherein the optical intensity modulator is a Mach-Zehnder interferometer type modulator (MZ MOD).

9. The duobinary optical transmission apparatus of claim 8, wherein the MZ MOD comprises one of a X-cut type MZ MOD having a single electrode and a Z-cut type MZ MOD having a dual electrode.

10. The duobinary optical transmission apparatus of claim 7, wherein the generator is a pulse pattern generator.

11. The duobinary optical transmission apparatus of claim 7, wherein the filter is a single-pole type low-pass-filter (LPF).

* * * * *